July 7, 1936.  G. L. HACK  2,046,779
MEANS FOR SECURING DETACHABLE ROAD VEHICLE WHEELS
Filed Aug. 23, 1935
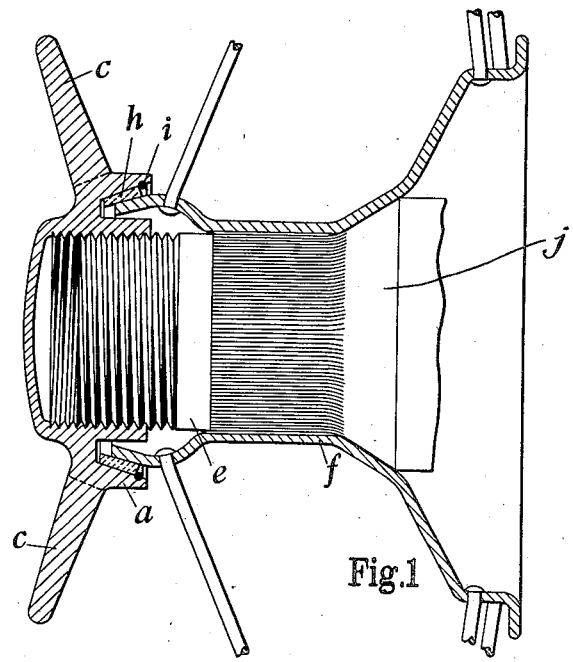
Fig.1
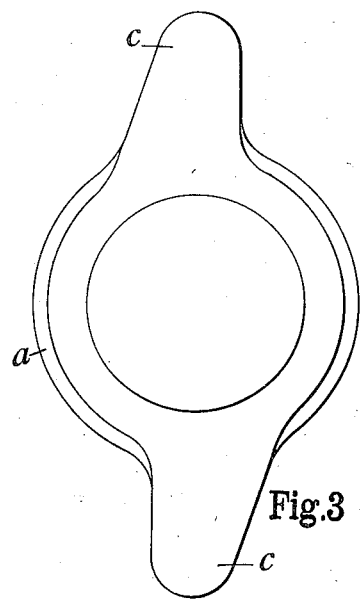
Fig.2
Fig.3
G. L. Hack
Inventor
By: Hascock Downing & Seebold
Attys.

Patented July 7, 1936

2,046,779

UNITED STATES PATENT OFFICE 2,046,779

MEANS FOR SECURING DETACHABLE ROAD VEHICLE WHEELS

George Lawrence Hack, Coventry, England, assignor to Dunlop Rubber Company Limited, Erdington, Birmingham, England Application August 23, 1935, Serial No. 37,572
In Great Britain September 14, 1934

2 Claims. (Cl. 301—9)

This invention relates to detachable road vehicle wheels of the kind in which a hollow hub is adapted to be secured in position by a screw threaded cap which engages a tapered part on the outer end of the hub and also a screw threaded portion of the axle or like part carrying the hub.

The object of the invention is to provide an improved cap which enables the required endwise pressure to be readily exerted on the hub, and which at the same time affords an effective grip on the end of the hub without risk of scoring the outer surface of the end of the hub.

The invention comprises the combination with a cap having a screw threaded portion for engaging the outer end of the axle on which the wheel hub is mounted, of a rotatable ring having a tapered internal periphery adaped to grip the tapered outer end of the wheel hub.

In the preferred form the invention comprises a cap as aforesaid in which the outer periphery of the rotatable ring and the complementary surface on the cap are inclined at a greater angle than the inner surface of the ring.

In the accompanying sheet of explanatory drawing:—

Figure 1 is a sectional elevation illustrating diagrammatically a wheel hub and axle fitted with a cap constructed in accordance with this invention.

Figures 2 and 3 are respectively sectional and front elevation of the cap.

In carrying the invention into effect in the manner shown, I employ a hollow steel cap $a$. The cap is provided with external lever like projections $c$ for use in attaching and detaching the cap. The cap is screw threaded internally at $d$ for engagement with the external thread on the axle $e$ which carries the hollow wheel hub $f$. Around the threaded portion of the cap there is formed an annular groove $g$, and into this groove is inserted a ring $h$ which is rotatable within the cap. The inner surface of the ring is adapted to pass over the end of the hub $f$, and is tapered to correspond with an external taper on the hub. The taper is preferably a small one, being about 20°, so as to afford an adequate frictional grip between the tapered portions of the ring and hub when the cap is screwed into position. The ring is preferably made of bronze or other suitable anti-friction material, though if desired it may be made of steel or cast iron. By making the ring of bronze or other suitable anti-friction material risk of scoring of the hub by the cap is minimized. A shoulder $j$ on the axle $e$ forms an abutment against which the hub $f$ is held when the cap $a$ is screwed into position.

In the preferred construction the external periphery of the ring and the contiguous surface on the cap are made to a larger taper than that of the inner periphery. The inclination of the outer periphery (that is to say the angle of the cone of which the said periphery forms a part) may be as much as, or more than, 45°, although 40° or rather less is suitable. The ring is held in position within the cap in any convenient manner, such as by means of a divided wire ring $i$ which engages a groove in the cap.

When the cap is being placed in position the ring $h$ binds on the tapered end of the hub $f$, and in the final tightening of the cap, as the latter rotates relatively to the ring, any risk of scoring of the hub is transferred from the hub to the cap. Further as the inclination of the outer surface of the ring $h$ is considerably larger than that of the inner periphery, the axial pressure required to be applied to the outer end of the hub by the cap is readily obtained.

The invention is not limited to the example above described except as claimed as subordinate details of design or construction can be varied to suit different requirements.

Having thus described my invention what I claim as new and desire to secure by Letters Patent is:—

1. For use in securing a hollow hub having a tapered outer end on an axle having a screw threaded portion and an abutment, a cap comprising a tapered part adapted to surround said tapered outer end and a screw threaded part adapted to engage said screw threaded portion, and a rotatable metal ring carried in the cap and having a tapered inner surface adapted to grip said tapered outer end and to hold said hub against said abutment.

2. For use in securing a hollow hub having a tapered outer end on an axle having a screw threaded portion and an abutment, a cap comprising a tapered part adapted to surround said tapered outer end and a screw threaded part adapted to engage said screw threaded portion, and a rotatable metal ring carried in the cap and having tapered inner and outer surfaces, the tapered outer surface of said ring engaging said tapered part and being inclined at a greater angle than the taper of the inner surface of said ring, which inner surface is adapted to grip the tapered outer end of the hub and to hold the latter against said abutment.

GEORGE LAWRENCE HACK.